A. M. CURRIER.
INSERTABLE SAW TOOTH.
APPLICATION FILED FEB. 25, 1919.
1,326,032.
Patented Dec. 23, 1919.
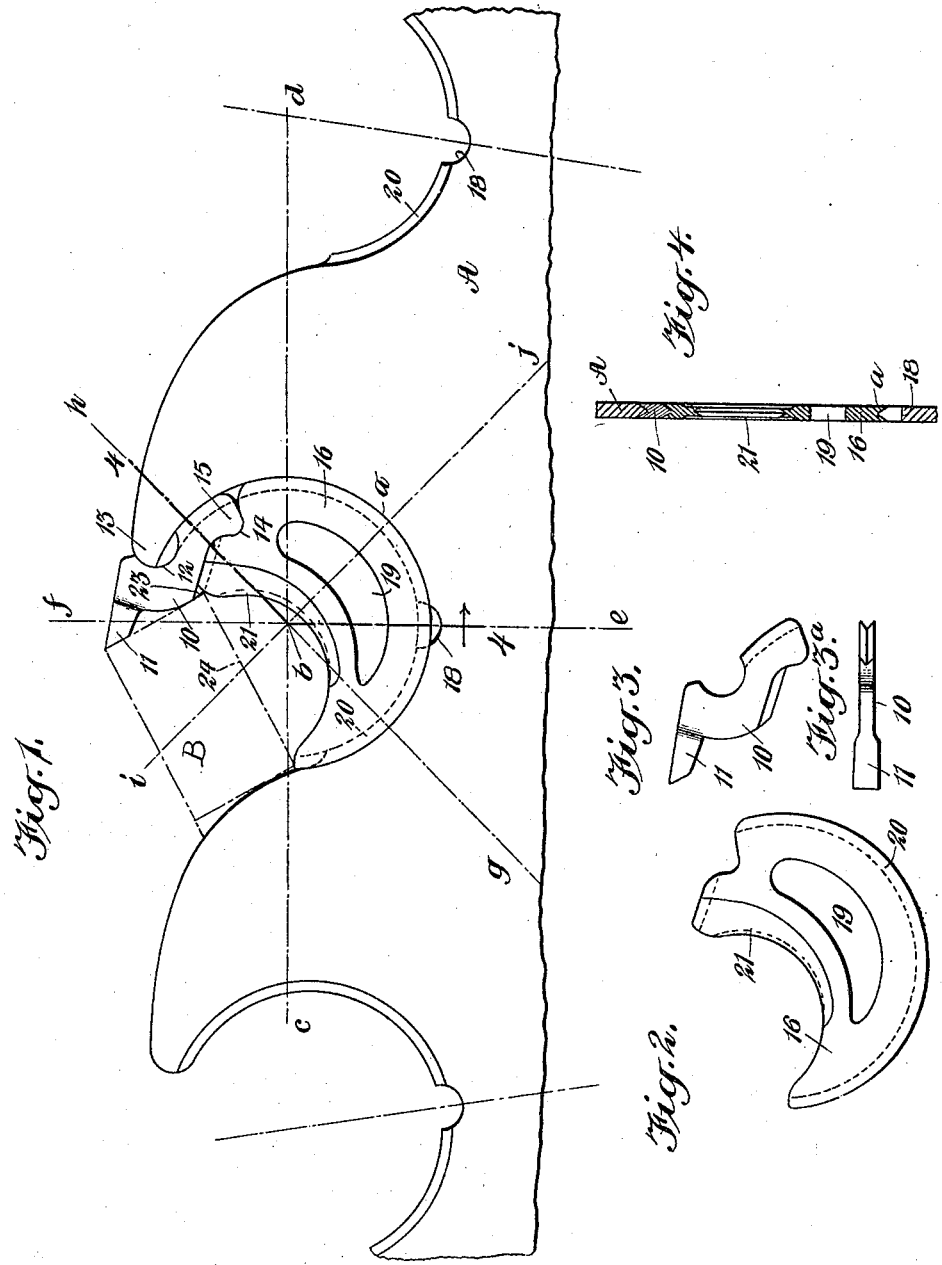
WITNESSES
INVENTOR
A. M. Currier
BY
ATTORNEYS

UNITED STATES PATENT OFFICE.

ALFRED M. CURRIER, OF ABERDEEN, WASHINGTON.

INSERTIBLE SAW-TOOTH.

1,326,032.　　　　　　　Specification of Letters Patent.　　Patented Dec. 23, 1919.

Application filed February 25, 1919.　Serial No. 279,066.

*To all whom it may concern:*

Be it known that I, ALFRED M. CURRIER, a citizen of the United States, and a resident of Aberdeen, in the county of Grays Harbor and State of Washington, have invented a new and Improved Insertible Saw-Tooth, of which the following is a description.

My invention relates to an insertible saw tooth adapted for circular saws, band saws or shingle saws, and the invention has for its general object to provide an insertible saw tooth and a holder therefor so formed and arranged relatively to each other and to the saw that certain advantages and results are obtained, among which are the following: The holder is essentially relieved of the thrust of the tooth or bit in the sawing operation, the thrust being directly received and absorbed by the saw blade by reason of the tooth at the back being formed with a socket which receives a stop projection on the saw blade; the bit holder along its base line and the corresponding seat presented by the socket in the blade are struck in a true arc of a circle; the holder is formed with a slot or an elongated curved opening which permits the holder to expand at its curved base edge or sealing edge without distortion of the holder, and also, the curved seat for the holder presents a depression, the provision of which promotes an expansion of the said seat in opposite directions from a point between the ends thereof for the prevention of distorting stresses in the seat and holder, thereby maintaining the same in a true arc of a circle notwithstanding expansion or contraction; and the saw tooth includes a bit and a holder accommodated in the socket of the saw blade and so arranged that the direction in which the holder exerts its pressure on the bit is such that in the expansion of the blade or the relative expansion of the edge portion, the pressure of the holder is not relieved and any tendency of the bit to fly outward is effectually counteracted and the bit maintained against displacement.

Other characteristics of my improved device will appear as the description proceeds.

Reference is to be had to the accompanying drawings forming a part of this specification, it being understood that the drawings are merely illustrative of one example of the invention.

Figure 1 is a side elevation of a portion of a saw blade equipped with one of my improved teeth and the holder therefor;

Fig. 2 is a side view of my improved tooth holder;

Fig. 3 is a side view of my improved bit or saw tooth proper;

Fig. 3ª is a plan view of said bit;

Fig. 4 is a section on the line 4—4, Fig. 1.

My improved bit or tooth proper presents a shank 10 and point 11, and at the back of the shank adjacent to the outer end, said shank is formed with a concave depression or socket 12 for a forwardly disposed stop point 13 presented by the saw blade A. The holder 16 of my improved tooth is formed with a concave depression or socket 14, and the inner forward corner 15 of the shank 10 constitutes a stop projection seating in said socket 14. The arrangement is such that the thrust exerted on the tooth when in operation is essentially absorbed by the blade A at the stop 13 and whereby also, the holder is substantially relieved of the pressure on the tooth in sawing.

The tooth holder 16 is curved at its seating edge or base edge 20 in the true arc of a circle, and the curved seat $a$ on which said edge seats in the blade A correspondingly presents a true arc of a circle. A circular saw, for example, expanding under the heat of sawing, expands relatively to a greater extent at the peripheral portion and the expansion adjacent to a given tooth will be in two directions at right angles to each other, that is, for example, one direction corresponding with a line $c$, $d$, representing a chord passing through the center $b$, from which the curve of seat $a$ and the seating edge 20 of the holder 16 is struck, and secondly, in a direction at right angles to said chord or in a direction corresponding with the radial line $e$, $f$, passing through said center, the mean of the expansion at the given tooth, or the resultant, being in a direction corresponding with the median line $g$, $h$, bisecting the angle $d$, $b$, $f$, and therefore at 45° to a radial line or a line perpendicular to the edge line of the blade. The shank 10 of the bit and the bit generally are disposed on a line approximately parallel with a line $i$, $j$ passing through the center $b$ at right angles to the median line $g$, $h$ and the holder 16 is so disposed relatively to the shank 10 as to exert its pressure substantially perpendicular to said shank, that is to say, approximately corresponding with the median line $g$, $h$ or line of resultant expansion.

The direction of the bracing pressure thus exerted by the holder on the bit is in consonance with the right angular lines of expansion $c$, $d$, $e$, $f$, as compared with holders usually employed in practice and exerting a bracing pressure corresponding or nearly so with the chord $c$, $d$, representing the one direction of expansion.

An important feature also of my invention resides in provision for permitting an expansion of the seat $a$ in opposite directions from a point between the respective ends thereof, for which purpose I form in the blade A a depression or cut 18 whereby the blade at the holder seat presents two additional terminals to respond to expansion and contraction and prevents a tendency of the blade to expand radially outward at depression 18, to an extent which would result in an uplift and partial unseating or buckling of the holder. To guard against distortion of the holder 16 under expansion and contraction, I form the holder with an elongated curved slot or opening 19 whereby the holder may elongate and contract at the base without distorting strains being developed.

The outer edge 21 of the holder 16 is concave and is formed with a V-shaped groove so as to chamber the sawdust in the throat B and discharge it at the terminal of the cut. The seat $a$ of the socket is tapered or V-shaped in cross section and the opposed base edge 20 of the holder 16 is correspondingly grooved, whereby the holder is firmly seated. Similarly, the back edge of the shank 10 is grooved as indicated at 22 to conform to the seat $a$, which is continued to receive the bit shank. Also, the front edge 23 of the shank 10 at the under side is beveled and the opposed edge 24 of the holder is correspondingly grooved. It will be observed also that the throat B is wider at the entrance than at points inward from the entrance, that is to say, if two parallel lines be drawn, the one from the point of the tooth to the opposite side of the throat and the other parallel therewith and bridging the concave presented by the outer edge of the holder 16, the first mentioned line will be the longer.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A saw blade having sockets therein, and insertible teeth for said sockets, each tooth including a bit and a holder therefor, said blade presenting at the rear of each socket a forwardly disposed rounded stop member, and the bit having in its back edge a concave socket conforming to and receiving said stop member, there being a depression in the holder at the outer end deeper than the remainder of the end edge, and adjacent to the back edge, and the inner end of the shank of the bit at the forward edge presenting a stop projection fitting said depression.

2. A saw including a blade having sockets therein, and insertible teeth in said sockets, each of said teeth including a bit and a holder therefor, the socket at the bottom thereof presenting a curved seat for the holder and the seating edge of the holder being correspondingly curved, said holder having a longitudinal opening between the outer edge and the seating edge of the holder and terminating approximately at equal distances from the respective ends of the holder to permit the seating edge to readily expand and contract without distorting the holder.

ALFRED M. CURRIER.